C. HOSKYNS.
SHIP STEERING WHEEL.
No. 8,087. Patented May 13, 1851.
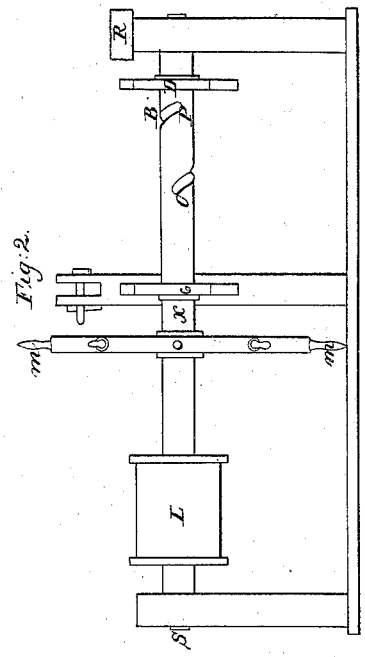
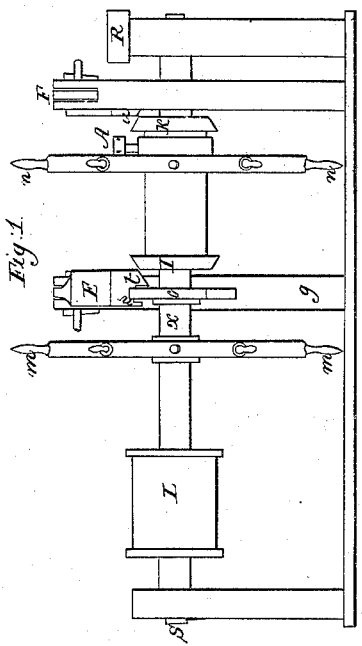
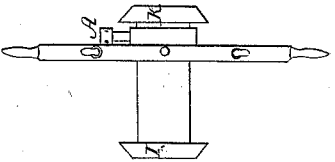
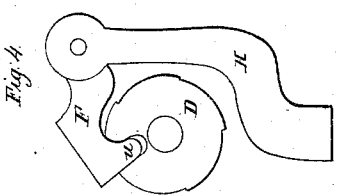
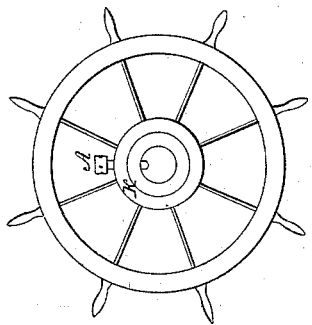
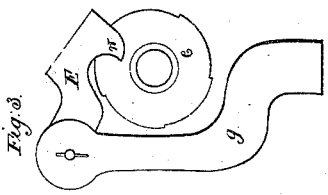

UNITED STATES PATENT OFFICE.

CHANDOS HOSKYNS, OF NEW ORLEANS, LOUISIANA.

APPARATUS FOR RELIEVING THE HELMSMAN FROM THE SHOCK OF THE RUDDER.

Specification of Letters Patent No. 8,087, dated May 13, 1851.

*To all whom it may concern:*

Be it known that I, CHANDOS HOSKYNS, of the city and parish of New Orleans and the State of Louisiana, have invented a new and useful Improvement in Ships' Steering Wheels; and I do hereby declare that the following is a full and exact description thereof, reference being had to the accompanying drawing and to the letters of reference marked thereon.

The nature of my improvement consists in the addition of a starboard and larboard pawl and ratchet, acting reciprocally with the wheel and rudder, through the medium of a helical motion, for the purpose of protecting the helmsman against the violence of the sea.

To enable others skilled in the art to make and use my invention, I will proceed to describe its construction and operation.

Figure 1, is a longitudinal elevation of a double wheel. Fig. 2, is a longitudinal elevation of a double wheel with one of the wheels $n$, the pawl pedestal H, and the pawl F, removed. Figs. 3, and 4, are end elevations from the stern of the larboard and starboard pawl, ratchet, and pedestal.

The wheel $n$, is given in front elevation in Fig. 5, and in longitudinal elevation in Fig. 6.

G, is the larboard, and H, is the starboard pawl pedestal.

E, is a larboard, and F, is the starboard pawl.

C, is the larboard, and D, is the starboard ratchet.

R, is the mariners compass, showing the forward end of the wheel.

S, is the stern or aft part.

The machine complete, with all its parts, I call the wheel, but I also call the two portions of the machine marked $m$, and $n$, the wheel $m$, and the wheel $n$. The drum L, acts in conjunction with the wheel $m$, on the old principle, viz—a number of turns of the tiller rope are taken around the drum L, while one of the blocks are made fast to the tiller, and the other to the gunwale of the ship. All the arrangement between $x$ and $s$, are on the old plan. My improvement is between $x$ and R.

B, is a groove, cut around the spindle to answer as a screw thread, in conjunction with the point of the capstan headed screw A, and the hub of the wheel $n$. A, and $n$, acting as female screw, and B, as male screw, and allowing the wheel $n$, to travel fore and aft, till it is brought up by each end of the hub at I and K, alternately bearing against the ratchets C, and D.

$t$ and $u$ in the pawls E, and F, are diagonal bearings, to match the diagonal rubbers I, and K. The distance between the ratchets C, and D, is greater than the length of the hub of the wheel $n$, by the quantity amounting to the sum of the breadth of the two bearings $t$, and $u$, so that when the hub is mid-ship, between the ratchets, the rubbers I, and K, will be clear of the bearings $t$, and $u$. The wheel being now put to port, the point of screw A traveling in the groove B, will carry the wheel $n$, astern till the hub at I bears against the ratchet C, and in its progress the rubber I, meeting the bearing $t$, will rub up the pawl E, allowing the ratchet C, to pass under it as long as the wheel is pressed to port. The rubber K, the pawl F, and the ratchet D, are all hid by the pedestal H, but they are shown in Fig. 4. When therefore $n$, is changed from port to starboard, the point of screw A, traveling forward in groove B, until the hub at K, bears against D, the rubber I, will be carried clear of the bearing $t$, allowing the pawl E, to work in its ratchet, while the rubber K, meeting the bearing $u$, will raise the pawl F, allowing the ratchet D, in its turn to pass under F. In construction, the velocity of the groove thread B, may with some slight allowances be determined, by the following obvious rule, viz—the breadth of one bearing multiplied by the number of teeth in one ratchet, the product will give the velocity of the thread or the distance from O, to P. (For instance) suppose the bearing $t$, to be $2\frac{1}{2}$ inches broad, and the number of teeth in each ratchet to be 8, (which I incline to think may be taken as fair proportions for a full sized wheel). Example, $2\frac{1}{2}$ inches $\times 8 = 20$ inches the velocity of the thread B.

The above calculation being attended to, let us suppose the helmsman in the act of putting the wheel $n$, to starboard, and let us suppose that at the same instant, the rudder shall receive a stroke of the sea in the direction in which it is being put, the wheel $n$, would be driven $2\frac{1}{2}$ inches from the ratchet D, in the direction of the helmsman, and would there remain, being $2\frac{1}{2}$ inches likewise between the ratchet C, and the end of the hub at I. Both pawls would consequently be found in their respective ratchets till the wheel was again put to port or starboard. The wheel n, in being shifted would travel 5 inches fore or aft, and in traveling those 5 inches, would make ¼ of a revolution or according to the drawing before us two spokes.

In light weather the pawls being thrown back out of the ratchets, and the screw A, being made to answer as a set screw, the wheel n, will then cease to travel fore and aft, and will become an ordinary double wheel, suitable for light weather.

Finally, I would make the hub of my wheel n, of cast iron, my pawls, pedestals, axle, and screw A, of wrought iron, my ratchets of either cast or wrought iron, and the rest of the wheel of the material usually used for such purposes.

Claim

What I claim as my invention and desire to secure by Letters Patent is,—

The combination of two sets of pawls, between which two sets of pawls, a wheel is placed loose upon the shaft having an endwise motion thereon by means of the male and female screw as described; said wheel being provided with a hub so fitted as to disengage the pawls when the hub arrives at the limit of its end play in either direction. The result being that the rudder secures itself through the agency of the pawls and is unlocked so as to be free to move in either direction by the first motion of the same wheel which afterward moves the rudder; in other words, I claim the combination of the hub secured to the wheel, the male and female screws or their equivalents, and the ratchets and pawls substantially in the manner and for the purposes described in this specification.

CHANDOS HOSKYNS.

Witnesses:
A. C. AINSWORTH,
GEORGE CLARK.